United States Patent
Song (10) Patent No.: US 9,298,558 B2
(45) Date of Patent: Mar. 29, 2016

(54) MEMORY AND MEMORY MODULE INCLUDING THE SAME

(71) Applicant: SK hynix Inc., Gyeonggi-do (KR)

(72) Inventor: Choung-Ki Song, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 147 days.

(21) Appl. No.: 14/192,531

(22) Filed: Feb. 27, 2014

(65) Prior Publication Data

US 2015/0149820 A1 May 28, 2015

(30) Foreign Application Priority Data

Nov. 27, 2013 (KR) ........................ 10-2013-0145207

(51) Int. Cl.
*G06F 11/00* (2006.01)
*G06F 11/14* (2006.01)
*G06F 11/20* (2006.01)

(52) U.S. Cl.
CPC .......... *G06F 11/1441* (2013.01); *G06F 11/201* (2013.01); *G06F 11/2002* (2013.01); *G06F 11/2005* (2013.01); *G06F 11/2007* (2013.01); *G06F 11/2017* (2013.01); *G06F 11/1456* (2013.01)

(58) Field of Classification Search
CPC ............ G06F 11/2002; G06F 11/2005; G06F 11/201; G06F 11/2017
See application file for complete search history.

(56) References Cited

U.S. PATENT DOCUMENTS

| | | | | |
|---|---|---|---|---|
| 6,115,798 A * | 9/2000 | Hayasaka | ........... | G06F 11/1441 707/999.202 |
| 6,336,174 B1 * | 1/2002 | Li | ........... | G06F 11/1441 365/228 |
| 8,046,546 B2 * | 10/2011 | Sartore | ........... | G06F 11/1441 711/101 |
| 8,595,427 B1 * | 11/2013 | Asnaashari | ........... | G11C 7/1072 711/102 |
| 8,671,243 B2 * | 3/2014 | Chen | ........... | G06F 11/1441 711/100 |
| 8,904,098 B2 * | 12/2014 | Amidi | ........... | G06F 11/1441 711/100 |
| 8,949,473 B1 * | 2/2015 | Haywood | ........... | G11C 8/00 709/203 |
| 2010/0052625 A1 * | 3/2010 | Cagno | ........... | G01R 31/028 320/166 |
| 2010/0115257 A1 * | 5/2010 | Hoang | ........... | G06F 11/1666 713/2 |
| 2012/0317382 A1 * | 12/2012 | Steed | ........... | G06F 11/1441 711/162 |
| 2013/0039128 A1 * | 2/2013 | Amidi | ........... | G11C 14/0009 365/185.08 |
| 2013/0086309 A1 | 4/2013 | Lee et al. | | |
| 2014/0215277 A1 * | 7/2014 | Judd | ........... | G06F 11/2284 714/42 |
| 2015/0089287 A1 * | 3/2015 | Jayakumar | ........... | G06F 1/30 714/23 |
| 2015/0242313 A1 * | 8/2015 | Lee | ........... | G06F 12/0638 711/103 |

FOREIGN PATENT DOCUMENTS

| | | |
|---|---|---|
| KR | 1020090045568 | 5/2009 |
| KR | 1020100041390 | 4/2010 |
| KR | 1020130071975 | 7/2013 |

* cited by examiner

*Primary Examiner* — Joshua P Lottich
(74) *Attorney, Agent, or Firm* — IP & T Group LLP (57) ABSTRACT

A memory unit including a first data transferring/receiving unit suitable for transferring/receiving data through a first data bus for communication with a host, a second data transferring/receiving unit suitable for transferring/receiving data through a second data bus for a data backup, and a control unit suitable for controlling the first data transferring/receiving unit and the second data transferring/receiving unit to be activated or inactivated according to whether a power failure occurs in the host.

13 Claims, 5 Drawing Sheets

MEMORY AND MEMORY MODULE INCLUDING THE SAME

CROSS-REFERENCE TO RELATED APPLICATIONS

The present application claims priority of Korean Patent Application No. 10-2013-0145207, filed on Nov. 27, 2013, which is incorporated herein by reference in its entirety.

BACKGROUND

1. Field

Exemplary embodiments of the present invention relate to memory units, a memory module, and a memory device.

2. Description of the Related Art

Memory modules are generally adapted for storing data in a data processing system, such as a personal computer (PC), a workstation, a server computer, a communication system and so forth. The data processing system has a plurality of memory chips on a module board therein.

Representative types of memory modules include a Registered Dual In-Line Memory Module (RDIMM) and a Load-Reduced Dual In-Line Memory Module (LRDIMM). These are described below with reference to FIGS. 1 and 2.

Figure 1:
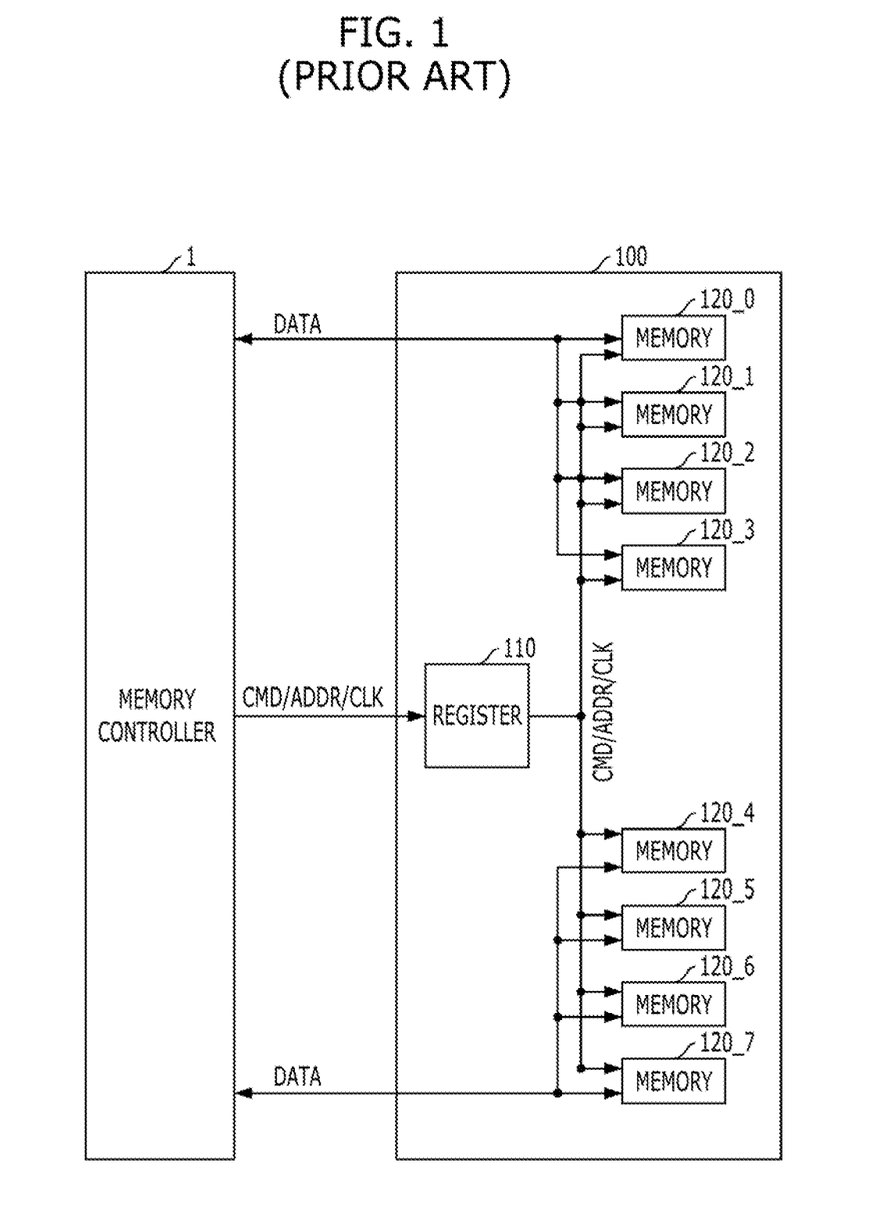
FIG. 1 illustrates a typical Registered Dual In-Line Memory Module (RDIMM) 100.

FIG. 1 illustrates a typical RDIMM-type memory module 100. FIG. 1 also shows a memory controller 1 in a host which transfers and receives data to and from the memory module 100 and provides the memory module 100 with an address ADDR, a clock CLK, and a command CMD for controlling the memory module 100.

Referring to FIG. 1, the RDIMM-type memory module 100 includes a register 110 and memory units 120_0 to 120_7. The register 110 buffers and transfers the command CMD, the address ADDR, and the clock CLK from the memory controller 1 to the memory units 120_0 to 120_7. Data is directly transferred between the memory controller 1 and the memory units 120_0 to 120_7 without intervention of the register 110.

Figure 2:
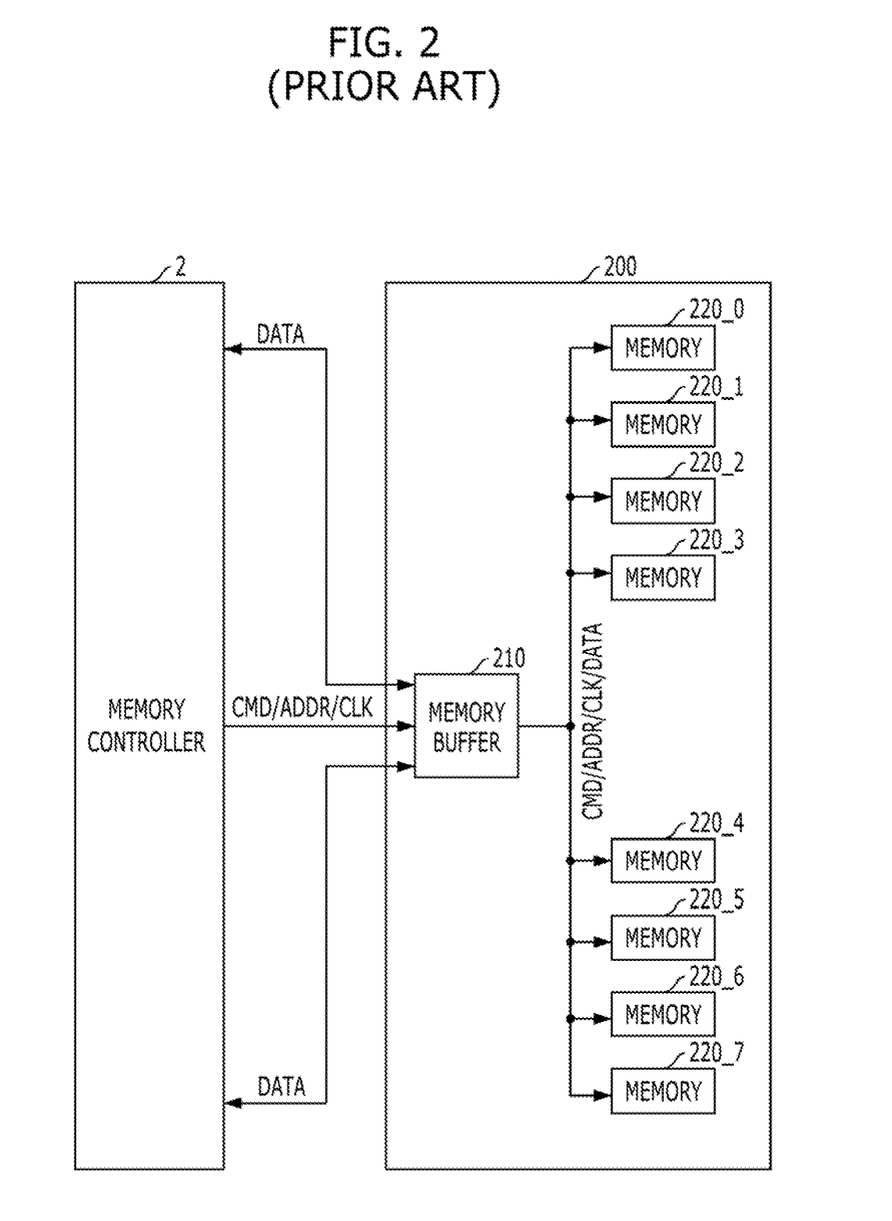
FIG. 2 illustrates a typical Load-Reduced Dual In-Line Memory Module (LRDIMM) 200.

FIG. 2 illustrates a typical LRDIMM-typed memory module 200. FIG. 2 also shows a memory controller 2 in a host, which transfers and receives data to and from the memory module 200 and provides the memory module 200 with an address ADDR, a clock CLK and a command CMD for controlling the memory module 200.

Referring to FIG. 2, the LRDIMM-typed memory module 200 includes a memory buffer 210 and memory units 220_0 to 220_7. The memory buffer 210 buffers and transfers the command CMD, the address ADDR, and the clock CLK from the memory controller 2 to the memory cells 220_0 to 220_7. Also, the memory buffer 210 buffers and transfers data between the memory controller 2 and the memory units 220_0 to 220_7. In comparison with the register 110 shown in FIG. 1, the memory buffer 210 has the additional function of buffering and transferring data between the memory controller 2 and the memory units 220_0 to 220_7.

With the memory buffer 210 having the additional function of buffering data, the LRDIMM-type memory module 200 may allow/support more logic ranks, achieve a faster response rate, and lower power consumption as compared to the RDIMM-typed memory module 100. The advantages of the LRDIMM-type memory module 200 may be conspicuous when the system has a huge internal memory capacity. However, the LRDIMM-type memory module 200 has the drawback of high manufacturing cost, which is 20% higher than that of the RDIMM-type memory module 100.

SUMMARY

An embodiment of the present invention is directed to memory units and a memory module including a memory device that may cope with power failure at a low manufacturing cost.

In accordance with an embodiment of the present invention, a memory unit may include a first data transferring/receiving unit suitable for transferring/receiving data through a first data bus for communication with a host, a second data transferring/receiving unit suitable for transferring/receiving data through a second data bus for a data backup, and a control unit suitable for controlling the first data transferring/receiving unit and the second data transferring/receiving unit to be activated or inactivated according to whether a power failure occurs in the host.

In accordance with another embodiment of the present invention, a memory module may include volatile memory suitable for communicating with a host through a first data bus and transferring and receiving backup data through a second data bus, nonvolatile memory suitable for backing up the data of the volatile memory that is transferred through the second data bus when a power failure occurs in the host, and an emergency power supplier suitable for supplying power for backing up data of the volatile memory into the nonvolatile memory when power failure occurs in the host.

In accordance with yet another embodiment of the present invention, a memory module may include a command receiving unit suitable for receiving a plurality of command signals, a command decoding unit suitable for decoding the command signals that are received through the command receiving unit to generate an internal setup command signal, an internal setup reset command signal, and a plurality of internal command signals, and a setup circuit suitable for performing a setup operation in response to the internal setup command signal and initializing setup values in response to the internal setup reset command signal.

In accordance with another embodiment of the present invention, a memory module may include a first data interface unit suitable for communicating data with a host through a first data bus, a second data interface unit suitable for communicating data with a data back-up unit through a second data bus for a data backup operation during an unstable power state of the host, and a control unit suitable for selectively activating the first and second data Interface units when activated by an unstable power state.

In accordance with another embodiment of the present invention, a memory module may include volatile memory suitable for communicating data with a host through a first data bus during a normal power state and communicating with a data back-up unit through a second data bus during an unstable power state of the host; a data back-up unit for backing up data transferred through the second data bus with secondary power during an unstable power state; and a control unit suitable for detecting an unstable power state, supplying secondary power, and selectively activating the data communication through the first and second data buses according to the unstable power state.

DETAILED DESCRIPTION

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough, complete, and will fully convey the scope of the present invention to those skilled in the art. Throughout the disclosure, like reference numerals refer to like parts of the various figures and embodiments of the present invention.

Figure 3:
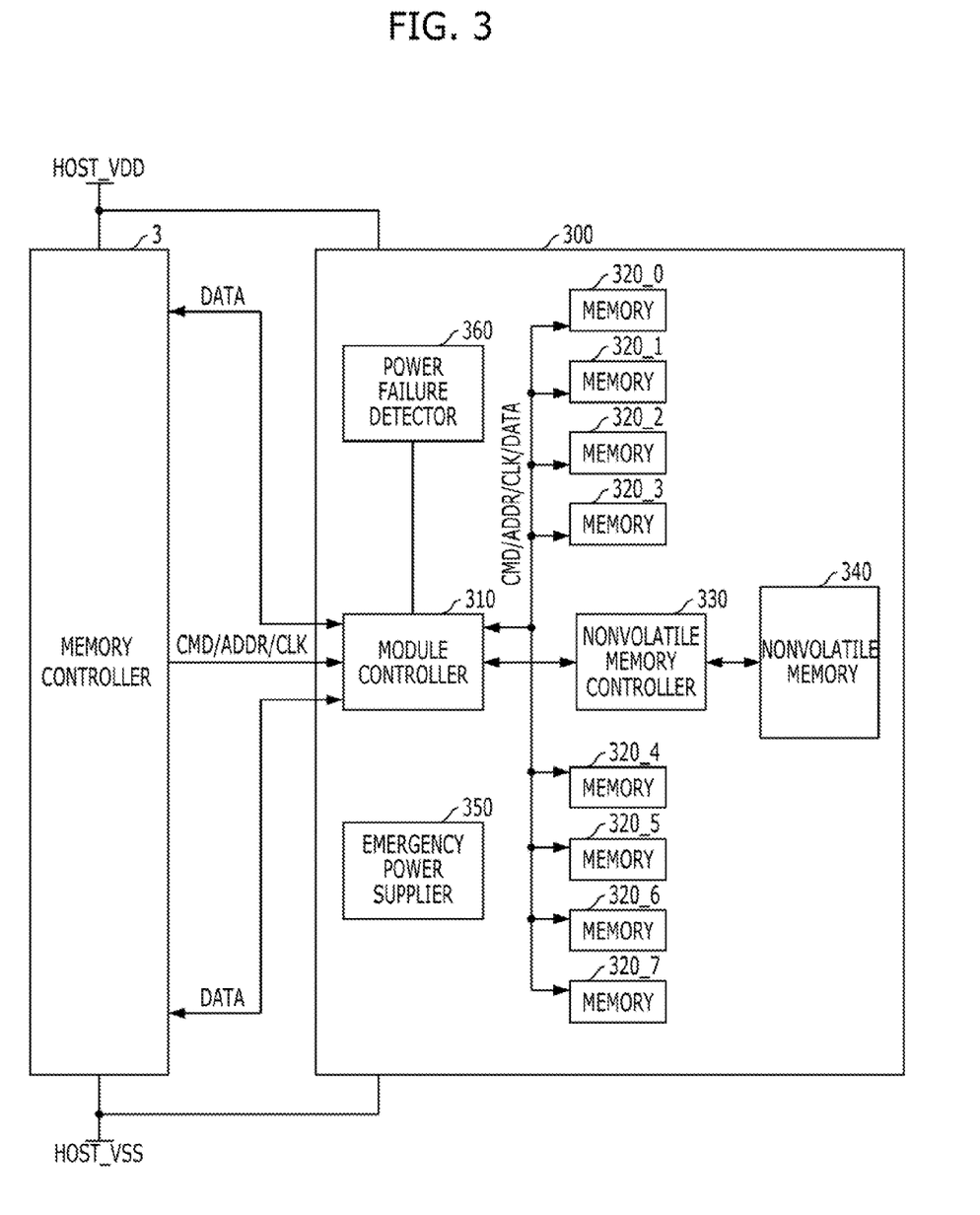
FIG. 3 illustrates a memory module 300 in accordance with a comparative example.

FIG. 3 illustrates a memory module 300 in accordance with a comparative example.

FIG. 3 shows a Nonvolatile Dual In-Line Memory Module (NVDIMM) 300 adopting the LRDIMM scheme. The NVDIMM 300 ensures data stability even in an unstable power state such as a power failure by backing up the data of memory units 320_0 to 320_7 into a nonvolatile memory 340, such as a flash memory. FIG. 3 also shows a memory controller 3 in a host, which transfers and receives data to and from the memory module 300 and provides the memory module 300 with an address ADDR, a clock CLK and a command CMD for controlling the memory module 300.

Referring to FIG. 3, the memory module 300 may include a module controller 310, memory units 320_0 to 320_7, a nonvolatile memory controller 330, nonvolatile memory 340, an emergency power supplier 350, and a power failure detector 360.

When host power HOST_VDD and/or HOST_VSS is normally supplied to the memory module 300, as in a normal power state, the module controller 310 may operate the same as the memory buffer 210 described above in reference to FIG. 2. When the power HOST_VDD and/or HOST_VSS of the host is in a normal power state, the module controller 310 may buffer and transfer the command CMD, address ADDR, and the clock CLK between the memory controller 3 and the memory units 320_0 to 320_7. Also, the module controller 310 may buffer and transfer data between the memory controller 3 and the memory units 320_0 to 320_7.

When the power failure detector 360 detects unstable host power HOST_VDD and/or HOST_VSS, that is, when the power failure detector 360 detects that the power source voltage HOST_VDD and/or the ground voltage HOST_VSS supplied from the host is instable, the power failure detector 360 shuts down the supply of the host power HOST_VDD and/or HOST_VSS to the memory module 300 and controls the memory module 300 to operate using the power of the emergency power supplier 350. The emergency power supplier 350 may be formed of a capacitor with a high capacity. For example, the emergency power supplier 350 may be formed of a super capacitor. The emergency power supplier 350 may supply emergency power for the data of the memory units 320_0 to 320_7 to be backed up into the nonvolatile memory 340. Also, the power failure detector 360 may notify the module controller 310 of the detected unstable power state.

Upon receipt of notification of an unstable power state in the host power HOST_VDD and/or HOST_VSS, the module controller 310 controls the data stored in the memory units 320_0 to 320_7 to be backed up into the nonvolatile memory 340. Specifically, the module controller 310 generates control signals by itself (such as a command CMD and an address ADDR), applies the generated control signals to the memory units 320_0 to 320_7 to read out all the data stored in the memory units 320_0 to 320_7, and controls the nonvolatile memory controller 330 to store the read out data from the memory units 320_0 to 320_7 into the nonvolatile memory 340. The nonvolatile memory controller 330 may control the nonvolatile memory 340 to store the read out data transferred from the module controller 310 into the nonvolatile memory 340.

The backed-up data of the nonvolatile memory 340 under an unstable power state may be returned to the memory units 320_0 to 320_7 after the host power HOST_VDD and/or HOST_VSS has recovered to a normal power state.

The NVDIMM has to secure the operation of memory units 320_0 to 320_7 for data backup under an unstable power state of the host power HOST_VDD and/or HOST_VSS. For example, even though the memory controller 3 operates abnormally due to the unstable power state of the host power HOST_VDD and/or HOST_VSS, it is ensured that the memory units 320_0 to 320_7 operate normally. When the memory controller 3 operates abnormally, for instance when power is not supplied to the memory controller 3, buses (which are coupled with the memory controller 3 for transferring the clock CLK, the command CMD, data, and the address ADDR) may have unstable voltage levels such as floating or grounding. When such unstable buses are directly coupled with the memory units 320_0 to 320_7, normal operation of the memory units 320_0 to 320_7 may not be secured. Therefore, the NVDIMM is typically implemented with the LRDIMM scheme that buffers data of all the buses coupled with the memory units 320_0 to 320_7 through the module controller 310 of the memory module 300. However, as described above, the LRDIMM-type memory module has the drawback of high manufacturing cost and it is therefore necessary to implement the NVDIMM with the RDIMM scheme to overcome the drawback of the LRDIMM scheme.

Figure 4:
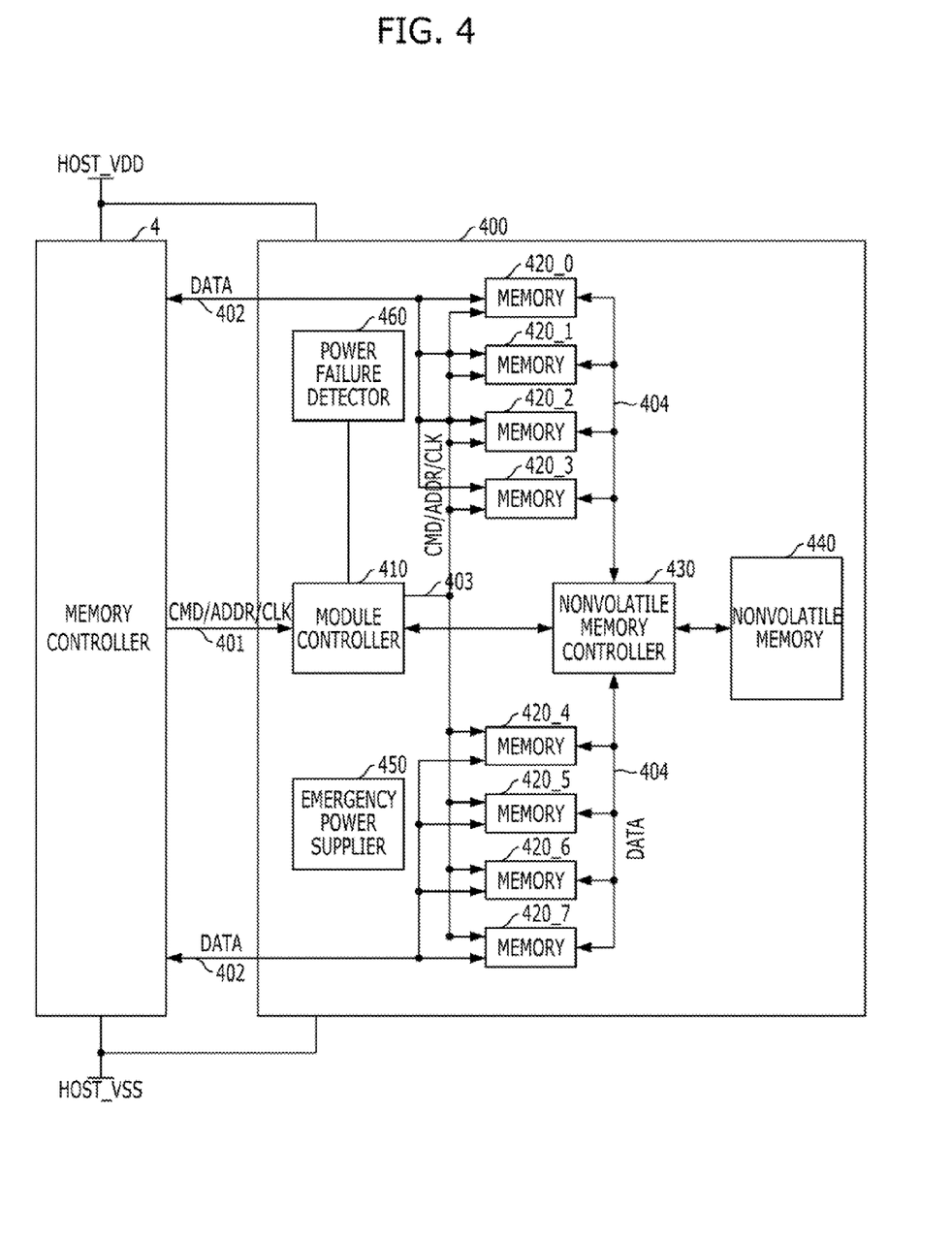
FIG. 4 illustrates a memory module 400 in accordance with an embodiment of the present invention.

FIG. 4 illustrates a memory module 400 in accordance with an embodiment of the present invention. FIG. 4 shows a nonvolatile dual in-line memory module (NVDIMM) 400 implemented with the RDIMM scheme. FIG. 4 also shows a memory controller 4 in a host, which transfers and receives data to and from the memory module 400 and provides the memory module 400 with an address ADDR, a clock CLK and a command CMD for controlling the memory module 400.

Referring to FIG. 4, the memory module 400 may include a module controller 410, memory units 420_0 to 420_7, a nonvolatile memory controller 430, a nonvolatile memory 440, an emergency power supplier 450, and a power failure detector 460.

When the host power HOST_VDD and/or HOST_VSS is in the normal power state, the module controller 410 and the memory module 400 may operate the same as the register 110 and the RDIMM 100, respectively described above with reference to FIG. 1. When the power HOST_VDD and/or HOST_VSS of the host is in the normal power state, the module controller 410 may buffer and transfer the command CMD, the address ADDR, and the clock CLK from the memory controller 4 to the memory units 420_0 to 420_7 through buses 401 and 403. Also, when the power HOST_VDD and/or HOST_VSS of the host is in the normal power state, the memory units 420_0 to 420_7 may directly communicate data with the memory controller 4 through a first data bus 402.

When the power failure detector 460 detects the unstable power state of the host power HOST_VDD and/or HOST_VSS, that is, when the power failure detector 460 detects that the power source voltage HOST_VDD and/or the ground voltage HOST_VSS supplied from the host are/is instable, the power failure detector 460 shuts down the supply of the host power HOST_VDD and/or HOST_VSS to the memory module 400 and controls the memory module 400 to operate by using the power of the emergency power supplier 450. The emergency power supplier 450 may be formed of a capacitor with a great capacity. For example, the emergency power supplier 450 may be formed of a super capacitor. The emergency power supplier 450 may supply emergency power for the data of the memory units 420_0 to 420_7 to be backed up into the nonvolatile memory 440. Also, the power failure detector 460 may notify the module controller 410 of the detected unstable power state.

Upon receipt of the notification of the host power HOST_VDD and/or HOST_VSS unstable power state, the module controller 410 may notify the memory units 420_0 to 420_7 of the unstable power state of the host power HOST_VDD and/or HOST_VSS. Also, the power failure detector 460 may directly notify the memory units 420_0 to 420_7 of the unstable power state of the host power HOST_VDD and/or HOST_VSS. When the memory units 420_0 to 420_7 are notified of the unstable power state of the host power HOST_VDD and/or HOST_VSS, the memory units 420_0 to 420_7 may stop data communication through the first data bus 402 and use a second data bus 404. In other words, the memory units 420_0 to 420_7 may use the first data bus 402 during the normal power state of the host power HOST_VDD and/or HOST_VSS and they may use the second data bus 404 during the unstable power state of the host power HOST_VDD and/or HOST_VSS.

During the unstable power state of the host power HOST_VDD and/or HOST_VSS, the module controller 410 may control the data stored in the memory units 420_0 to 420_7 to be backed up into the nonvolatile memory 440. To be specific, the module controller 410 generates control signals by itself (such as a command CMD and an address ADDR), applies the generated control signals to the memory units 420_0 to 420_7 to read out all the data stored in the memory units 420_0 to 420_7, and controls the nonvolatile memory controller 430 to store the read out data from the memory units 420_0 to 420_7 into the nonvolatile memory 440. The nonvolatile memory controller 430 may control the nonvolatile memory 440 to store the read out data, which is transferred from the memory units 420_0 to 420_7 through the second data bus 404, into the nonvolatile memory 440.

The backed-up data of the nonvolatile memory 440 under the unstable power state may be returned to the memory units 420_0 to 420_7 after the host power HOST_VDD and/or HOST_VSS is recovered to the normal power state.

According to an embodiment of the present invention, the memory units 420_0 to 420_7 may communicate data with the memory controller 4 through the first data bus 402 for normal operation during the normal power state and may communicate data with the nonvolatile memory controller 430 through the second data bus 404 for back up operations during the unstable power state. The memory units 420_0 to 420_7 may use the first data bus 402 while the host power HOST_VDD and/or HOST_VSS is in the normal power state, whereas they use the second data bus 404 for a data backup when the unstable power state of the host power HOST_VDD and/or HOST_VSS is detected. Since the memory units 420_0 to 420_7 use the second data bus 404 instead of the first data bus 402 when an unstable power state of the host power HOST_VDD and/or HOST_VSS is detected, the data in the memory units 420_0 to 420_7 may be backed up and secured even if the first data bus 402 is unstably grounded or floats due to an unstable power state causing an abnormal operation of the memory controller 4. According to an embodiment of the present invention, the NVDIMM may adopt the RDIMM scheme instead of the LRDIMM scheme.

Each of the memory units 420_0 to 420_7 may include a memory device for storing data. For example, the memory units 420_0 to 420_7 may be Dynamic Random Access Memory (DRAM) devices and they may be Synchronous DRAM (SDRAM) devices which operate in synchronization with a clock signal of a system. The memory units 420_0 to 420_7, however, may not be limited to those used in the embodiments disclosed but all types of volatile memories may be used as the memory units 420_0 to 420_7.

Herein, the volatile memory units may be memory units whose data is erased when power is turned off, or the memory units whose data retention time after power is turned off is not long. The nonvolatile memory 440 may be a NAND flash memory. However, the nonvolatile memory 440 is not limited to the NAND flash memory, and all kinds of nonvolatile memories, such as a NOR flash memory, resistive Random Access Memory (RRAM), phase RAM (PRAM), magnetic RAM (MRAM), and a Spin Transfer Torque MRAM (STT-MRAM) may be the nonvolatile memory 440.

The structures inside the memory module 400 illustrated in FIG. 4 may be integrated or separated. For example, the module controller 410, the power failure detector 460, and the nonvolatile memory controller 430 may be integrated into one chip, or they may be separated into more chips. Meanwhile, the number of the memory units 420_0 to 420_7 and the number of the nonvolatile memory 440 inside the memory module 400 may vary according to a memory design. Also, although FIG. 4 illustrates data communication through the second data bus 404 for the data back-up operation intervened by the memory units 420_0 to 420_7, the nonvolatile memory controller 430, and the nonvolatile memory 440, as another embodiment, the memory units 420_0 to 420_7 and the nonvolatile memory 440 may directly communicate data without intervention of the nonvolatile memory controller 430 when data transfer protocols of the memory units 420_0 to 420_7 and the nonvolatile memory 440 are designed to be compatible.

Figure 5:
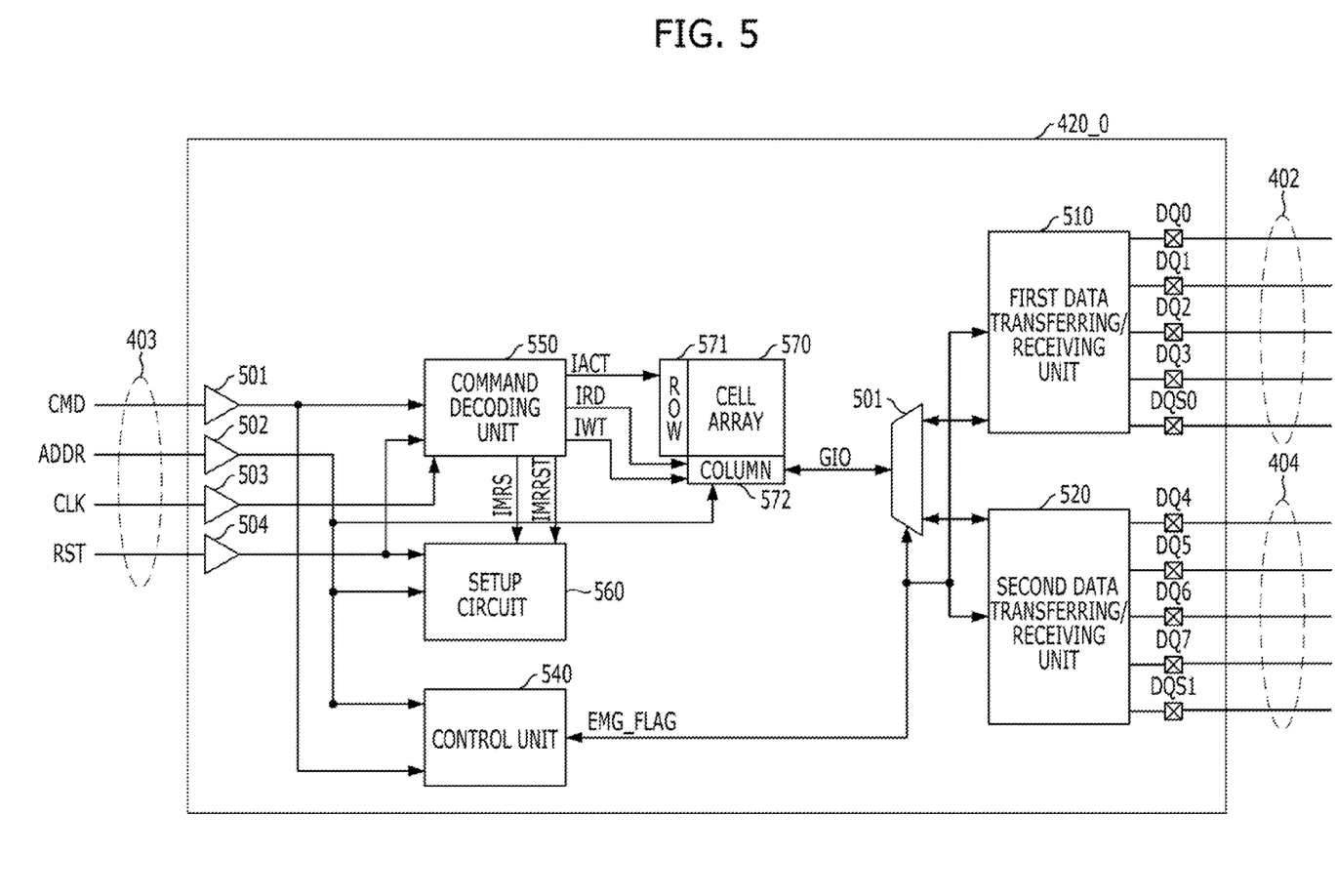
FIG. 5 illustrates memory unit 420_0 shown in FIG. 4.

FIG. 5 illustrates the memory unit 420_0 shown in FIG. 4. The other memory units 420_1 to 420_7 may be formed the same as the memory unit 420_0 shown in FIG. 4.

Referring to FIG. 5, the memory unit 420_0 may include a command receiving unit 501, an address receiving unit 502, a clock receiving unit 503, a first data transferring/receiving unit 510, a second data transferring/receiving unit 520, an internal data bus GIO, a selection unit 530, a control unit 540, a command decoding unit 550, a setup circuit 560, a reset signal receiving unit 504, a cell array 570, a row circuit 571, and a column circuit 572.

The command receiving unit 501 may receive a command CMD that is applied to the memory unit 420_0 through the bus 403. The address receiving unit 502 may receive an address ADDR that is applied to the memory unit 420_0 through the bus 403. The clock receiving unit 503 may receive a clock CLK that is applied to the memory unit 420_0 through the bus 403. The reset signal receiving unit 504 may receive a reset signal RST that is inputted through the bus 403. Herein, the command CMD and the address ADDR may include multi-bit signals, individually, and the clock CLK may be a differential signal.

The command decoding unit 550 may decode the command CMD received through the command receiving unit 501 and generate internal command signals IACT, IRD, IWT, IMRS and IMRRST. Although FIG. 5 exemplarily shows an internal active command signal IACT, an internal read command signal IRD, an internal write command signal IWT, an internal setup command signal IMRS and an internal setup reset command signal IMRRST, it is obvious to those skilled in the art that the command decoding unit 550 may generate more diverse internal command signals.

The setup circuit 560 may set up various factors needed for the operation of the memory unit 420_0, such as latency and modes. The setup circuit 560 may decide setup items and setup values by using the entire or part of the address ADDR that is received through the address receiving unit 502 when the internal setup command signal IMRS is enabled. The setup values of the setup circuit 560 may be initialized when the internal setup reset command signal IMRRST is enabled. The setup values of the setup circuit 560 may also be initialized in response to the reset signal RST that is received through the reset signal receiving unit 504. Whereas the internal setup reset command signal IMRRST is a signal for initializing the setup circuit 560 alone, the reset signal RST initializes not only the setup circuit 560 but also all the other circuits that may be initialized inside of the memory 420_0, such as latch and flipflop circuits. The reset signal RST may usually be used in the initialization operation of the memory unit 420_0 after power-up. The internal setup reset command signal IMRRST may be used to change the setup value optimized to the memory controller 4 to a setup a value optimized to the module controller 410 when the subject controlling the memory unit 420_0 is changed from the memory controller 4 to the module controller 410. That is, if the setup circuit 560 is initialized without the internal setup reset command signal IMRRST but with the reset signal RST, in the circumstance of a power failure occurring in the host, the values of all the other circuits are initialized, losing the data of the memory unit 420_0. Thus, it may be impossible to back up the data.

The cell array 570 may include a plurality of memory cells that are array in the form of matrix including columns and rows. The row circuit 571 may activate a row selected based on an address, which is a word line, when the internal active command signal IACT is enabled. The column circuit 572 reads data from a column selected based on an address, which is a bit line, and transfers the data to the internal data bus GIO when the internal read command signal IRD is enabled, and the column circuit 572 writes the data of the internal data bus GIO in a selected column when the internal write command signal IWT is enabled.

The control unit 540 may generate an emergency signal EMG_FLAG by using some bits of the command CMD received through the command receiving unit 501 and some bits of the address ADDR received through the address receiving unit 502. As described before, when a power failure occurs in the host, the module controller 410 may notify the memory unit 420_0 of the host power failure. The notification may be made by sending the command CMD and the address ADDR in a particular pattern. The control unit 540 may detect the notification and generate the emergency signal EMG_FLAG informing there was a power failure in the host. Also, as previously described, the power failure detector 460 may directly notify the memory unit 420_0 of the power failure occurring in the host. In this case, another signal, which is not the address ADDR or the command CMD, may be used and the control unit 540 may generate the emergency signal EMG_FLAG. The emergency signal EMG_FLAG generated in the control unit 540 may be used to control the selection unit 530, the first data transferring/receiving unit 510, and the second data transferring/receiving unit 520.

The selection unit 530 may make the Internal data bus GIO transfer and receive data to and from the first data transferring/receiving unit 510, or make the Internal data bus GIO transfer and receive data to and from the second data transferring/receiving unit 520. When the emergency signal EMG_FLAG is disabled, for example, when the power of the host is in the normal power state, the selection unit 530 may make the internal data bus GIO transfer and receive data to and from the first data transferring/receiving unit 510. Also, when the emergency signal EMG_FLAG is enabled, that is, when a failure occurs in the host power, the selection unit 530 may make the internal data bus GIO transfer and receive data to and from the second data transferring/receiving unit 520. Herein, the internal data bus GIO may include 32 lines. The number of the lines of the internal data bus GIO may be different according to the number of bits of data that are programmed or read in the cell array 570 at once.

The first data transferring/receiving unit 510 is activated when the emergency signal EMG_FLAG is disabled, and the first data transferring/receiving unit 510 transfers and receives data by using the first data bus 402. During a read operation, the first data transferring/receiving unit 510 may perform a parallel-to-serial transformation on 32-bit data transferred from the internal data bus GIO and output four data pads DQ0 to DQ3. Also, during a write operation, the first data transferring/receiving unit 510 may perform a serial-to-parallel transformation on data received through the four data pads DQ0 to DQ3 and transfer the obtained data to the internal data bus GIO. Meanwhile, the first data transferring/receiving unit 510 may transfer and receive not only data but also a data strobe signal, which is a signal for strobing data, to and from the first data bus 402 by using a data strobe pad DQS0.

The second data transferring/receiving unit 520 is activated when the emergency signal EMG_FLAG is enabled, and the second data transferring/receiving unit 520 transfers and receives data by using the second data bus 404. During a read operation, the second data transferring/receiving unit 520 may perform a parallel-to-serial transformation on 32-bit data transferred from the internal data bus GIO and output four data pads DQ4 to DQ7. Also, during a write operation, the second data transferring/receiving unit 520 may perform a serial-to-parallel transformation on data received through the four data pads DQ4 to DQ7 and transfer the obtained data to the internal data bus GIO. Meanwhile, the second data transferring/receiving unit 520 may transfer and receive not only data but also a data strobe signal, which is a signal for strobing data, to and from the second data bus 404 by using a data strobe pad DQS1.

The memory unit 420_0 of FIG. 5 may directly transfer and receive data to and from the memory controller 4 of the host through the first data bus 402 for normal operation during the normal power state. However, when the host power is in the unstable power state, the memory unit 420_0 may back up data through the second data bus 404. Therefore, the memory unit 420_0 may normally transfer and receive data even if the memory controller 4 performs an operation abnormally when a power failure occurs in the host. Also, since the reset signal of the memory unit 420_0 is divided into a reset signal RST for resetting all the structure inside of the memory unit 420_0 and a reset signal IMRRST for resetting only the setup value of the memory unit 420_0, it is possible to stably reset the setup value when the subject in charge of controlling the memory unit 420_0 is changed from the memory controller 4 to the module controller 410.

According to the embodiments of the present invention, a memory module capable of coping with a power failure may be provided at a low manufacturing cost.

While the present invention has been described with respect to the specific embodiments, it will be apparent to those skilled in the art that various changes and modifications may be made without departing from the spirit and scope of the invention as defined in the following claims.

What is claimed is:

1. A memory unit, comprising:
a first data transferring/receiving unit suitable for transferring/receiving data through a first data bus for communication with a host;
a second data transferring/receiving unit suitable for transferring/receiving data through a second data bus for a data backup;
a control unit suitable for controlling the first data transferring/receiving unit and the second data transferring/receiving unit to be activated or inactivated according to whether a power failure occurs;
a cell array;
an internal data bus electrically coupled to the cell array; and
a selection unit suitable for allowing the internal data bus to transfer data to and from one of the first and second data transferring/receiving units.

2. The memory unit of claim 1, wherein the control unit activates the first data transferring/receiving unit when a power supply is in a normal state, and activates the second data transferring/receiving unit when the power failure occurs.

3. The memory unit of claim 1, wherein the memory operates using an emergency power when the power failure occurs.

4. A memory unit, comprising:
a first data transferring/receiving unit suitable for transferring/receiving data through a first data bus for communication with a host;
a second data transferring/receiving unit suitable for transferring/receiving data through a second data bus for a data backup; and
a control unit suitable for controlling the first data transferring/receiving unit and the second data transferring/receiving unit to be activated or inactivated according to whether a power failure occurs,
wherein the first data transferring/receiving unit and the second data transferring/receiving unit transfer and receive a data and a data strobe signal for strobing the data through a corresponding one of the first and second data buses, individually.

5. A memory unit, comprising:
a first data transferring/receiving unit suitable for transferring/receiving data through a first data bus for communication with a host;
a second data transferring/receiving unit suitable for transferring/receiving data through a second data bus for a data backup;
a control unit suitable for controlling the first data transferring/receiving unit and the second data transferring/receiving unit to be activated or inactivated according to whether a power failure occurs;
a command receiving unit suitable for receiving a plurality of command signals;
a command decoding unit suitable for decoding the command signals that are received through the command receiving unit to generate an internal setup command signal, an internal setup reset command signal, and a plurality of internal command signals; and
a setup circuit suitable for performing a setup operation in response to the internal setup command signal and initializing setup values in response to the internal setup reset command signal.

6. A memory module, comprising:
a volatile memory suitable for communicating with a host through a first data bus and transferring and receiving backup data through a second data bus;
a nonvolatile memory suitable for backing up the data of the volatile memory that is transferred through the second data bus when a power failure occurs in the host; and
an emergency power supplier suitable for supplying power for backing up the data of the volatile memory into the nonvolatile memory when the power failure occurs in the host,
wherein the volatile memory includes:
a first data transferring/receiving unit suitable for transferring/receiving a data through the first data bus;
a second data transferring/receiving unit suitable for transferring/receiving a data through a second data bus;
a control unit suitable for controlling the first data transferring/receiving unit and the second data transferring/receiving unit to be activated or inactivated according to whether a power failure occurs in the host;
a cell array;
an internal data bus electrically coupled to the cell array; and
a selection unit suitable for allowing the internal data bus to transfer data to and from one of the first and second data transferring/receiving units.

7. The memory module of claim 6, further comprising:
a nonvolatile memory controller suitable for controlling the nonvolatile memory; and
a module controller suitable for controlling the volatile memory by using a command, an address, and a clock that are transferred from the host during a normal operation, and controlling the volatile memory and the nonvolatile memory controller to back up the data of the volatile memory into the nonvolatile memory when the power failure occurs in the host.

8. The memory module of claim 7, further comprising:
a power failure detector suitable for detecting the power failure of the host.

9. The memory module of claim 6, wherein the control unit activates the first data transferring/receiving unit when a power supply of the host is in a normal state, and activates the second data transferring/receiving unit when the power failure occurs.

10. A memory module, comprising:
a volatile memory suitable for communicating with a host through a first data bus and transferring and receiving backup data through a second data bus;
a nonvolatile memory suitable for backing up the data of the volatile memory that is transferred through the second data bus when a power failure occurs in the host; and
an emergency power supplier suitable for supplying power for backing up the data of the volatile memory into the nonvolatile memory when the power failure occurs in the host,
wherein the volatile memory includes:
a first data transferring/receiving unit suitable for transferring/receiving a data through the first data bus;

a second data transferring/receiving unit suitable for transferring/receiving a data through a second data bus; and a control unit suitable for controlling the first data transferring/receiving unit and the second data transferring/receiving unit to be activated or inactivated according to whether a power failure occurs in the host, wherein the first data transferring/receiving unit and the second data transferring/receiving unit transfer and receive data and a data strobe signal for strobing the data through a corresponding one of the first and second data buses, individually.

11. A memory unit, comprising:

a command receiving unit suitable for receiving a plurality of command signals;

a command decoding unit suitable for decoding the command signals that are received through the command receiving unit to generate an internal setup command signal, an internal setup reset command signal, and a plurality of internal command signals; and a setup circuit suitable for performing a setup operation in response to the internal setup command signal and initializing setup values in response to the internal setup reset command signal.

12. The memory unit of claim 11, further comprising:

a reset signal receiving unit suitable for receiving a reset signal; and a plurality of internal circuits that are resettable, wherein the setup circuit and the internal circuits are initialized when the reset signal is enabled.

13. The memory unit of claim 11, further comprising:

an address receiving unit suitable for receiving a plurality of address signals, wherein the setup circuit decides a setup value by using all or part of the address signals that are received through the address receiving unit.

* * * * *